(12) United States Patent
Al-Ashour et al.

(10) Patent No.: US 12,421,981 B1
(45) Date of Patent: Sep. 23, 2025

(54) PUMP SHAFT STAND AND METHOD FOR SERVICING A PUMP

(71) Applicant: SAUDI ARABIAN OIL COMPANY, Dhahran (SA)

(72) Inventors: Fadhel Al-Ashour, A-Ahasa (SA); Leuitnant Mazengera, A-Ahasa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/811,441

(22) Filed: Aug. 21, 2024

(51) Int. Cl.
  *F04D 29/60* (2006.01)
  *B23P 6/00* (2006.01)
  *B66F 3/08* (2006.01)

(52) U.S. Cl.
  CPC .............. *F04D 29/60* (2013.01); *B23P 6/00* (2013.01); *B66F 3/08* (2013.01); *B66F 2700/04* (2013.01)

(58) Field of Classification Search
  CPC ......... Y10T 29/49238; Y10T 29/53848; Y10T 29/53857–53878; Y10T 29/49318; Y10T 29/49721–4973; Y10T 29/49815; F04D 29/60; F04D 29/044; B66F 3/08; B66F 2700/04; B23P 6/00; B23P 19/04
  See application file for complete search history.

(56) References Cited

U.S. PATENT DOCUMENTS

| | | | | |
|---|---|---|---|---|
| 1,034,642 | A * | 8/1912 | Parker | B66F 3/08 |
| | | | | 254/99 |
| 5,224,917 | A * | 7/1993 | Kilsdonk | B25B 27/023 |
| | | | | 29/259 |
| 5,714,814 | A | 2/1998 | Marioni | |
| 2016/0238048 | A1* | 8/2016 | Halabi | F04D 13/10 |
| 2019/0078465 | A1 | 3/2019 | Choi | |
| 2021/0239133 | A1* | 8/2021 | Kono | F01D 25/285 |

\* cited by examiner

*Primary Examiner* — Matthew P Travers
(74) *Attorney, Agent, or Firm* — Bracewell LLP; Constance G. Rhebergen; Keith R. Derrington

(57) ABSTRACT

A pump shaft stand for supporting a pump shaft while a pump is being serviced. The pump shaft stand includes a frame, a receptacle coupled with the frame, and an elevator for positioning the receptacle. The elevator is adjustable to place the receptacle in a designated position, so that when an end of the pump shaft is supported by the receptacle, the pump shaft does not move by an amount that can damage the shaft or associated components of the pump.

9 Claims, 8 Drawing Sheets

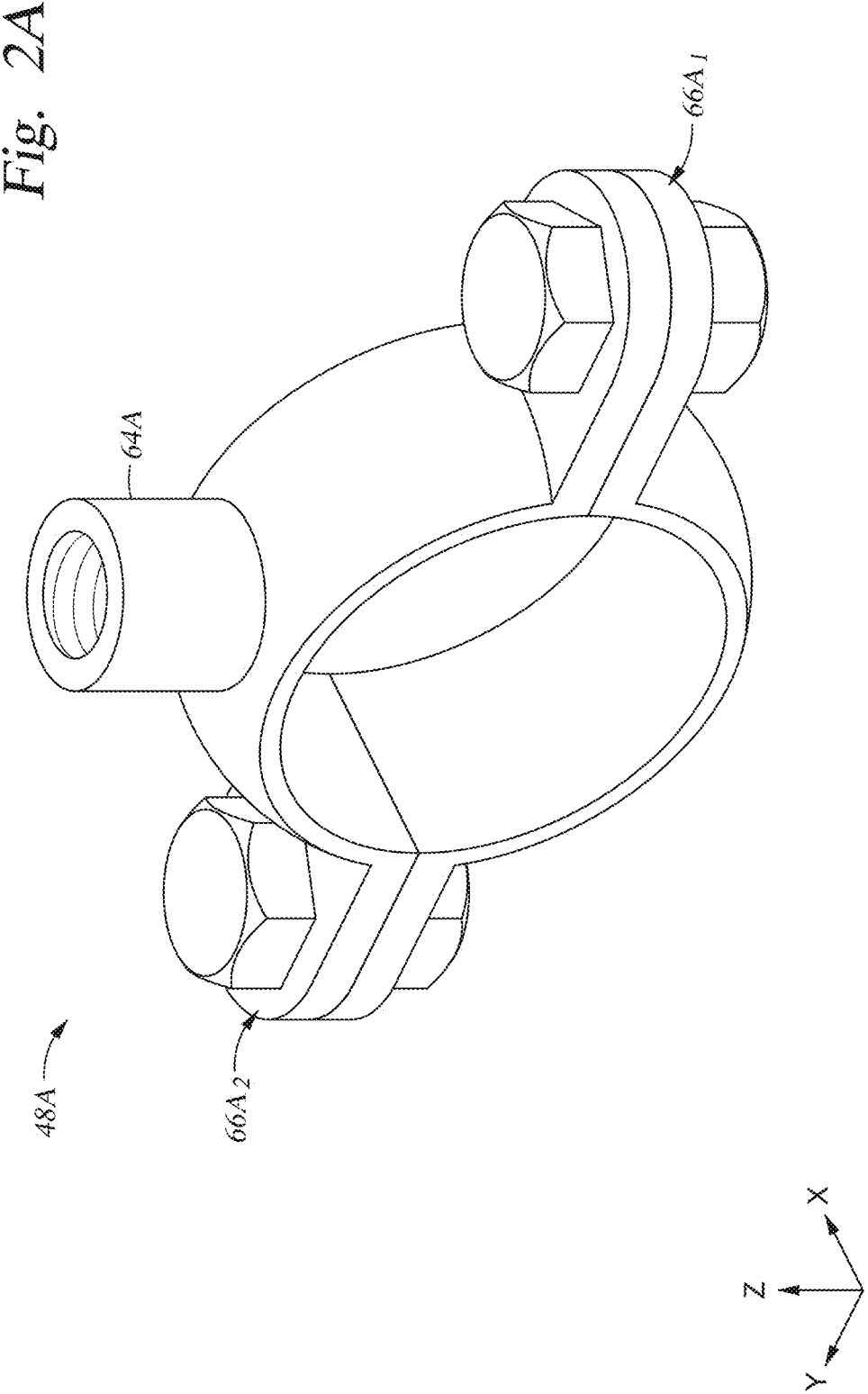

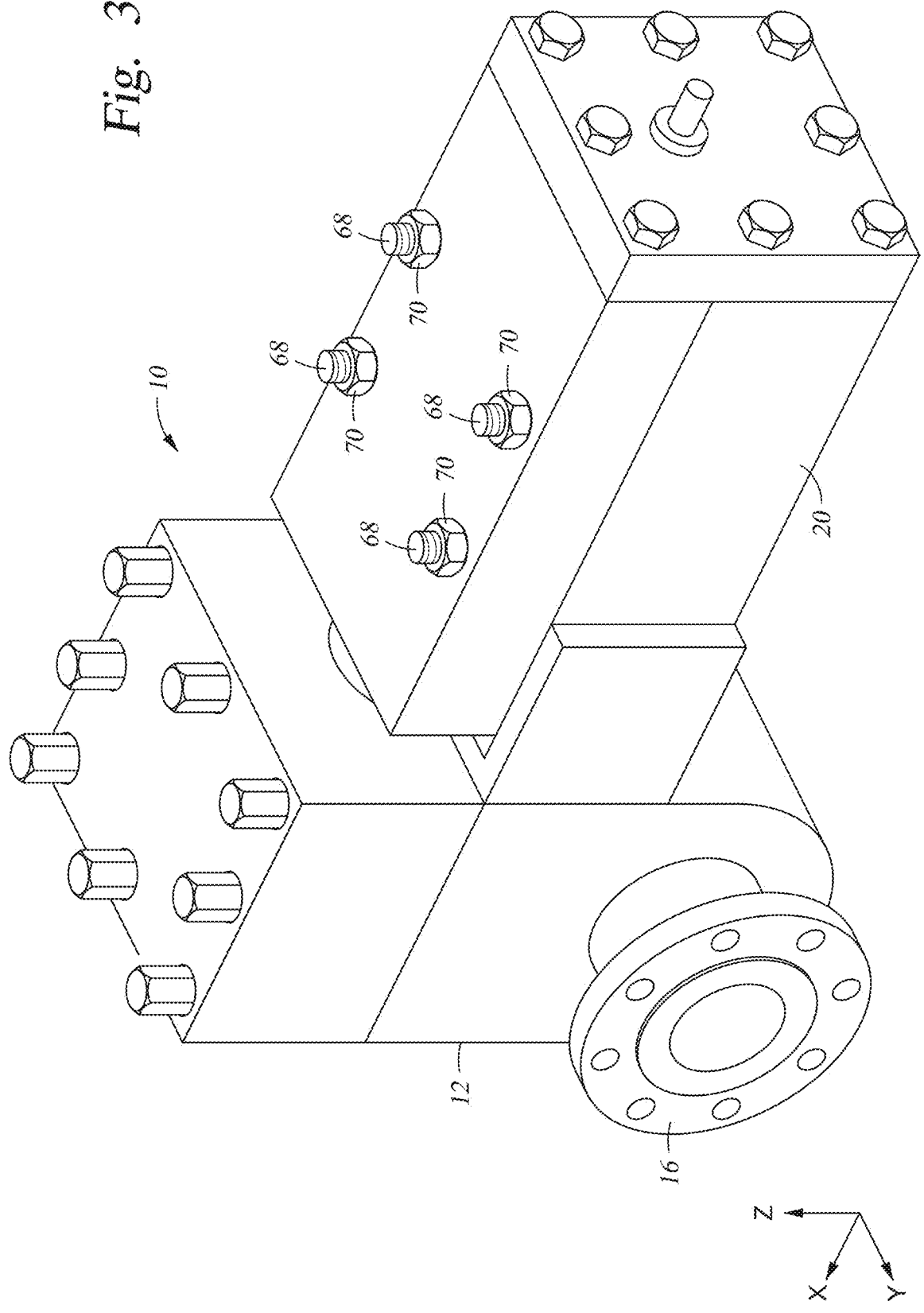

PUMP SHAFT STAND AND METHOD FOR SERVICING A PUMP

BACKGROUND OF THE INVENTION

1. Field of Invention

The present disclosure relates to supporting a pump shaft during maintenance of the pump, which maintains the shaft in positions that are not damaging to internal parts of the pump, such as mechanical seals, the shaft, etc.

2. Description of Prior Art

Centrifugal pumps typically include a shaft with impellers on one end and a motor on the opposite end for rotating the shaft and the impellers, The impellers are within a housing that has a low pressure side in which liquid is delivered, and a high pressure side from which pressurized fluid is discharged. Bearings usually circumscribe the shaft, and during shaft rotation, reduce friction between the shaft and non-moving parts of the pump.

Maintenance of centrifugal pump bearings occasionally requires that the shaft be lifted and supported. A crane is sometimes used for raising the shaft, and once raised, a stand is used for supporting the shaft while the pump bearings are being serviced. Problems with these techniques include that cranes are not always available, and when available they require a large amount of space. Moreover, using cranes or other lifting devices allow for radial movement of the shaft by an amount defined as overrising the shaft, which refers to moving the shaft by a distance that potentially bends the shaft or damages associated part, such as shaft seals. Overrising in some pump shafts occurs at distances of 0.003" or greater. The stands also introduce problems if they include compressible materials, such as wood, that affect the required accuracy of the shaft lift.

SUMMARY OF THE INVENTION

Disclosed is an example of a pump shaft stand for use with servicing a pump, and that includes a frame with leg members and a cross beam supported on the leg members, an elevator assembly coupled with the cross beam and having an attachment connector that is selectively positioned at discrete distances from the cross beam, and a receptacle coupled to the attachment connector that selectively supports an end of a pump shaft from the pump. The leg members include a pair of leg members that each have vertical posts with apertures through which opposing ends of the cross beam are inserted, and the cross beam is optionally slidable within the apertures so that positions of the leg members on the cross beam are adjustable. In an alternative, the leg members further include feet that attach to ends of the legs distal from the apertures, the feet having slots formed along an axial portion that selectively receive bolts for securing the pump shaft stand to a surface. In one example, the elevator assembly includes a rod that extends through a hole in the cross beam and a nut threadingly coupled with the rod, and the nut is optionally in abutting contact with the cross beam, so that rotating the nut adjusts a distance of the attachment connector from the cross beam so that the pump shaft is maintained in a designated position. In one embodiment, the receptacle is a monolithic annular member with an opening formed axially therethrough for receiving the end of the pump shaft, or is a segmented split ring.

Also disclosed is a method of servicing a pump that includes obtaining a pump shaft stand having a frame, an elevator supported on the frame, and a receptacle coupled with the elevator; adjusting the elevator to place the receptacle at a designated position, so that when the receptacle engages a pump shaft of the pump, the pump shaft is in a non-damaging orientation; and engaging the pump shaft with the pump shaft stand and supporting the pump shaft in the non-damaging orientation. The method further optionally includes removing lower bearings from beneath the pump shaft after the pump shaft is engaged with the pump shaft stand. In alternatives, the elevator includes a rod a threaded outer surface, a fastener in abutting contact with the frame and that is threadingly coupled with the rod. An example of adjusting the elevator involves rotating the fastener. In an example, the method further includes monitoring a position of the shaft with a micrometer, and further adjusting the elevator based on the monitored position. In an embodiment, the frame includes feet with elongated slots, where a housing of the pump includes a bolt, the method further including securing the frame to the housing by inserting the bolt through one of the slots and fastening a nut onto the bolt. In another example, the frame is made up of legs having apertures formed therethrough and a cross beam on which the elevator is mounted, where opposing ends of the cross-beam inserts into the apertures. The method further optionally includes adjusting placement of the frame by sliding the legs with respect to the cross beam. Embodiments exist in which the pump is partially disassembled prior to engaging the pump shaft with the pump shaft stand, the method further includes reassembling the pump, and optionally further includes moving the pump shaft stand to a different pump and repeating the steps of adjusting and engaging.

BRIEF DESCRIPTION OF DRAWINGS

Some of the features and benefits of the present invention having been stated, others will become apparent as the description proceeds when taken in conjunction with the accompanying drawings, in which:

FIG. 2A is a perspective view of an alternate embodiment of a receptacle for use with the shaft stand of FIG. 2.

FIG. 3 is a perspective view of the pump of FIG. 1 and disconnected from the motor.

Figure 1:
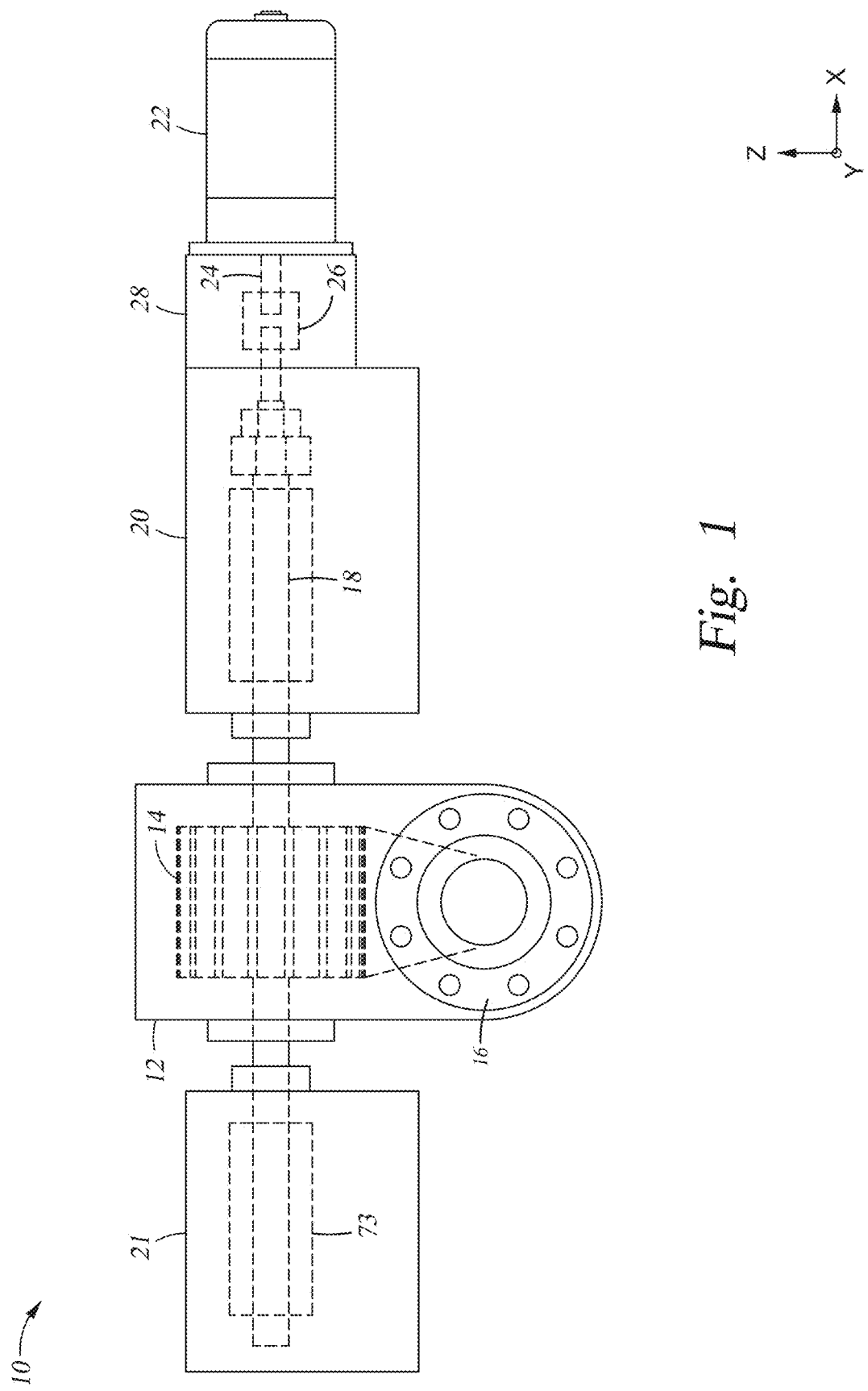
FIG. 1 is a schematic example of a pump connected to a motor by a shaft.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1 is a schematic example of a pump 10 with a main casing 12 for housing an impeller 14 and other internals of the pump 10. A flanged inlet 16 is formed through the casing 12 to provide a path for fluid to flow to the impeller 14. Projecting laterally from opposing lateral sides of the impeller 14 is an attached pump shaft 18 (shown in dashed outline) and which extends into in-board and outbound bearing housings 20, 21 shown disposed adjacent main casing 12. In the example of FIG. 1, pump 10 is depicted as a "between-bearing pump." Coupled with pump 10 is a motor 22 having an output shaft 24 shown attached to shaft 18 by a coupling 26. The coupling 26 and portions of shaft 18 and shaft 24 in coupling 26 are housed within a coupling box 28. Energizing motor 22 causes output shaft 24 to rotate, which rotates coupling 26, shaft 18, and impeller 14.

Figure 2:
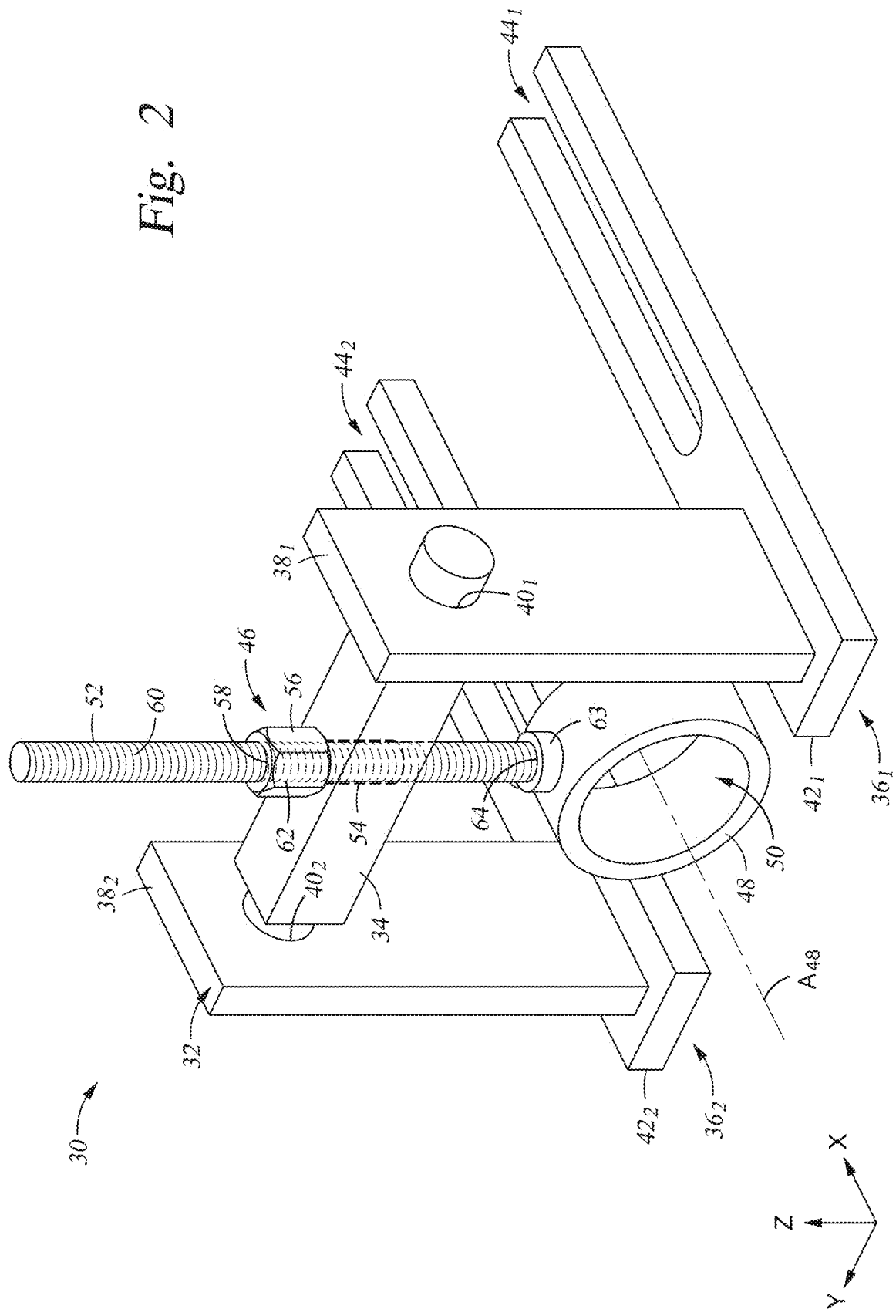
FIG. 2 is a perspective view of an example of a shaft stand for use with the pump shaft of FIG. 1.

Shown in schematic perspective view in FIG. 2 is an example of a pump shaft stand 30, which selectively supports shaft 18 when servicing pump 10 (FIG. 1). Pump shaft stand 30 includes a frame 32 having a cross beam 34 supported on leg members $36_{1,2}$. Leg members $36_{1,2}$ include vertical posts $38_{1,2}$ having apertures $40_{1,2}$ formed through ends of each of the posts $38_{1,2}$. Opposing ends of cross beam 34 are shown inserted within the apertures $40_{1,2}$, and cross beam 34 is adjustably slideable within the apertures $40_{1,2}$. Apertures $40_{1,2}$, and ends of cross beam 34 that insert within the apertures $40_{1,2}$ have substantially circular cross sections, which allows pivoting movement of receptacle 48 about an axis of cross beam 34. In alternatives, ends of cross beam 34 and apertures $40_{1,2}$ have one or more flats on their outer surfaces, which when inserted into apertures $40_{1,2}$, fixes cross beam 34 (and receptacle 48) in a designated orientation with respect to the other components in the frame 32. Shown on ends of posts $30_{1,2}$ opposite apertures $40_{1,2}$ are feet $42_{1,2}$, which are generally elongate members with slots $44_{1,2}$ formed through the feet $42_{1,2}$ that project longitudinally from an end opposite where the posts $38_{1,2}$ attach to the feet $42_{1,2}$ and extend between upper and lower surfaces of the feet $42_{1,2}$. Coupled with frame 32 is an elevator assembly 46 that includes a receptacle 48, which is shown as an annular member having a ring-like construction. An opening 50 is formed through receptacle 48 shown aligned with axis $A_{48}$. Opening 50 has a diameter dimensioned to receive shaft 18 within, and is optionally lined with a material being softer than the material making up the receptacle 48, such as brass, aluminum, synthetic materials, elastomers etc., that is not potentially damaging to material making up shaft 18. Elevator assembly 46 includes a rod 52, an end of which the receptacle 48 is mounted. Rod 52 is inserted through a hole 54 formed transversely through the cross beam 34. The elevator assembly 46 further includes a nut 56 with an axial bore 58, threads 60 on rod 52 engage threads 62 in bore 58 to threadingly couple nut 56 with rod 52. An end of rod 52 is shown connected to the receptacle 48 by an attachment connector 63, which engages a threaded hole 64 formed through a sidewall of the receptacle 48. In examples, nut 56 has a profiled outer surface, such as knurls or flats, to facilitate application of a rotational force onto nut 56. Rotating nut 56 causes relative movement of threads 62, 60, which displaces rod 52 with respect to nut 56 to adjust a vertical position of the receptacle 48. Alternatively, the receptacle 48 is laterally positioned by sliding the cross beam 34 within apertures $40_{1,2}$ laterally in the direction of the X axis. An alternate embodiment of the receptacle 48A is shown in FIG. 2A in which the receptacle 48A is shown as a split ring and having eyelet couplings $66A_{1,2}$ where the split ring segments join.

Figure 4:
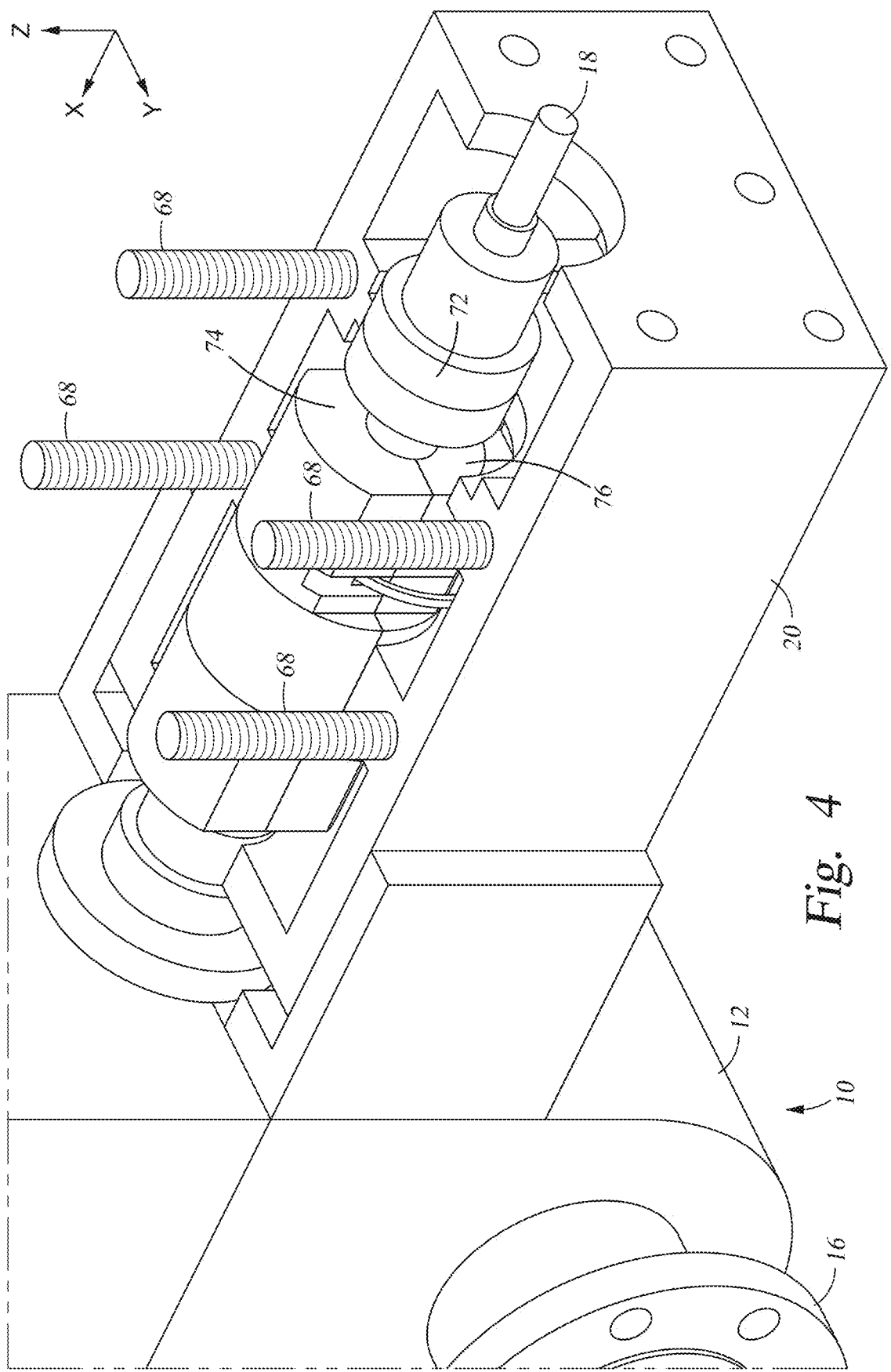
FIG. 4 is a perspective view of an example of servicing the pump of FIG. 3, and with a portion of a top bearing housing removed.
Figure 5:
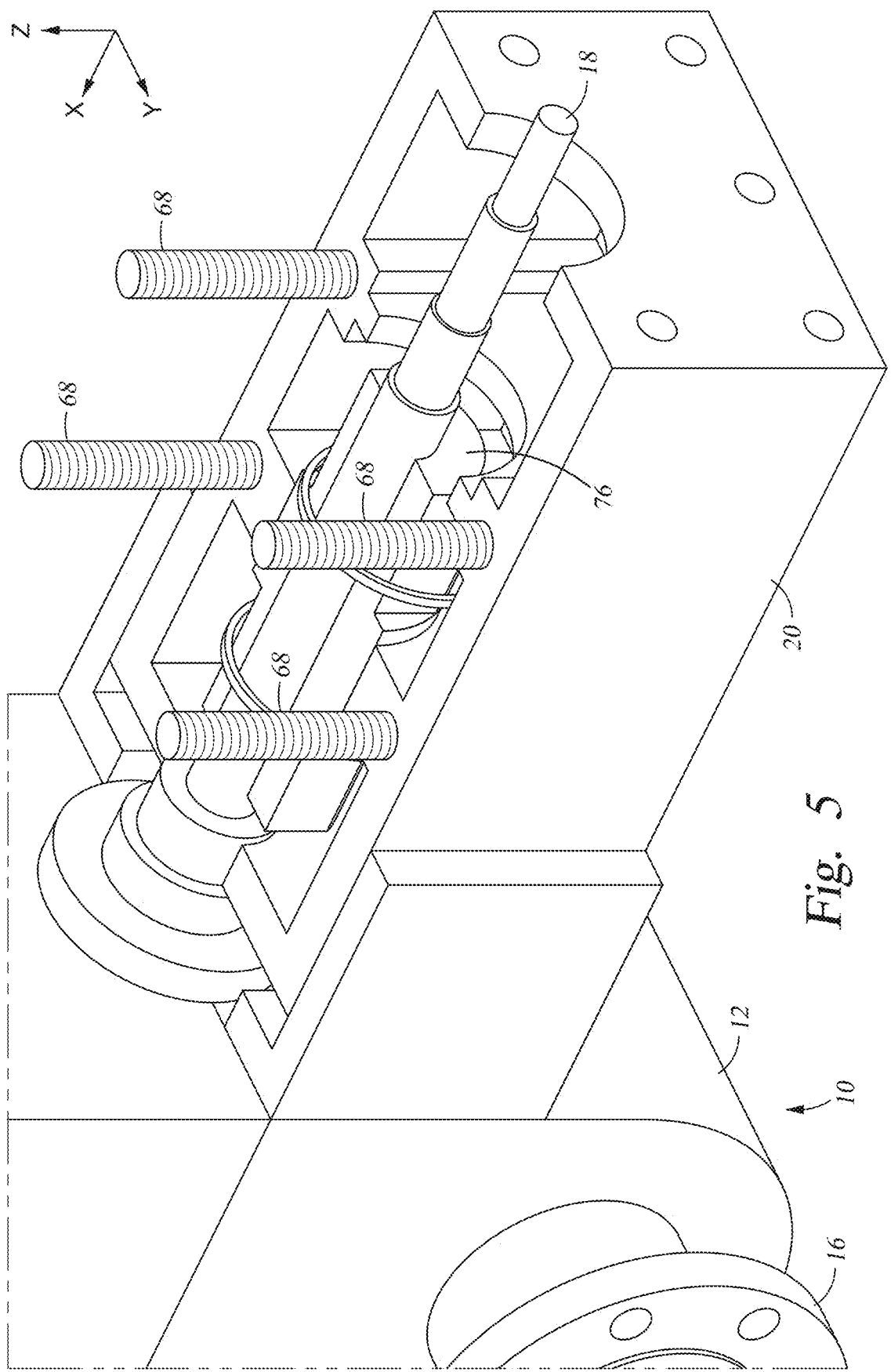
FIG. 5 is a perspective view of the example of servicing the pump of FIG. 4 with upper shaft bearings removed.

Shown in FIG. 3 is a perspective view of a step of servicing pump 10 and in which the pump 10 is disconnected from the motor 22 (FIG. 1), and disassembling bolt 68 and nut 70 of coupling box 28 to allow removal of the side casing 20. In a subsequent step of operation shown in perspective view in FIG. 4, the upper portion of side housing 20 has been removed to expose shaft 18 and attached bearings 72, 73 (FIG. 1), 74, 76. As shown, bearings 72, 73 are roller bearings and bearings 74, 76 are upper and lower journal bearings. In FIG. 5 is a sequential step of pump servicing in which the upper bearings 74 (FIG. 4) have been removed leaving lower bearings 76 within the side casing 20.

Figure 6:
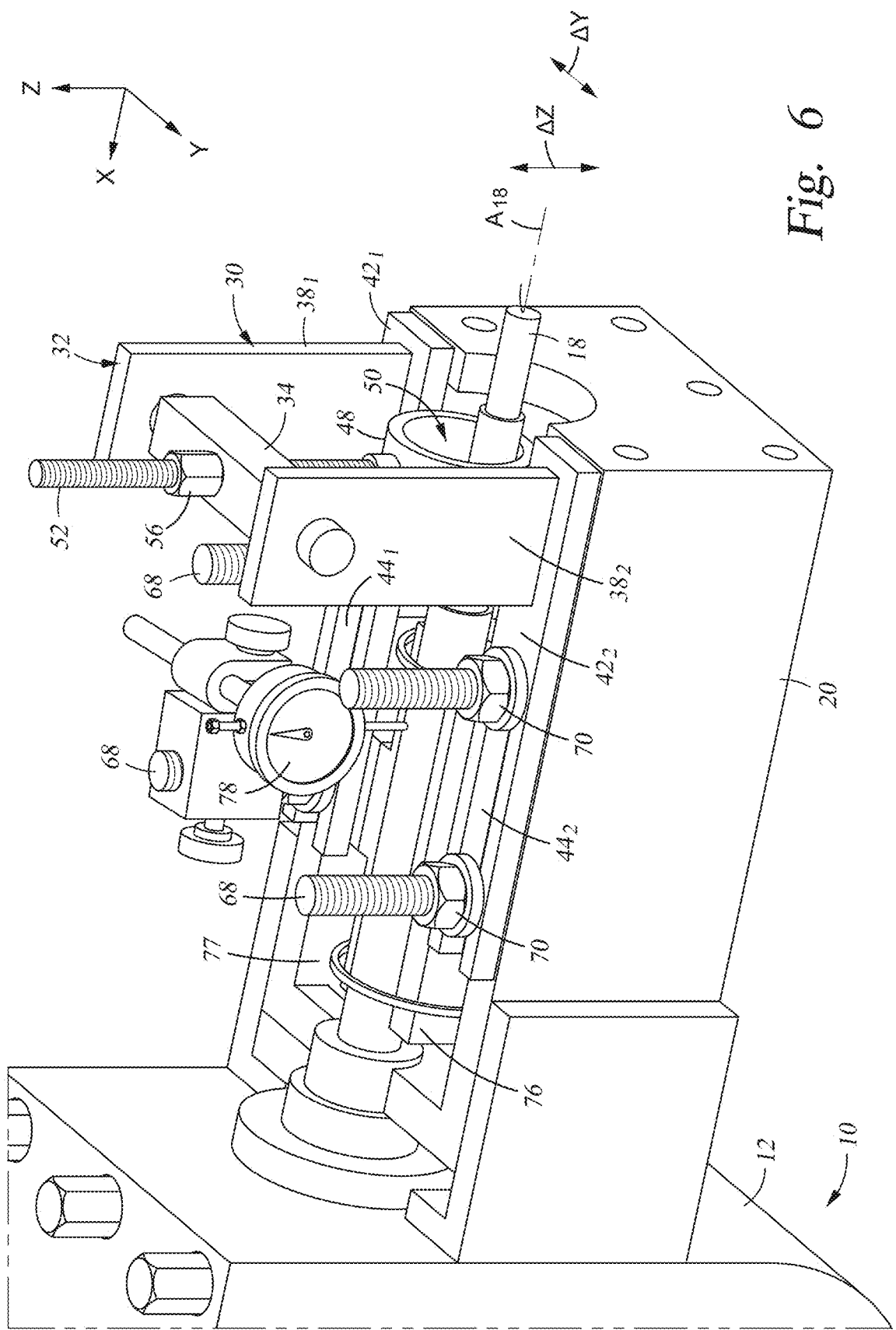
FIG. 6 is a perspective view of the example of servicing the pump of FIG. 5 with the shaft stand of FIG. 2 supporting the pump shaft.

Referring now to FIG. 6, with lower bearings 76 in place in the side casing 20, the pump shaft stand 30 is deployed for holding shaft 18 in a stable configuration for further servicing of pump 10. As shown, the shaft 18 is inserted into the opening 50 of receptacle 48, which supports the shaft 18 in a designated position and orientation, and limits vertical and horizontal movement or deflection of shaft 18 to distances within a tolerance range that does not result in damage to the shaft 18 or hardware coupled with or otherwise associated with the shaft 18, such as seals 77 on the shaft 18. For the purposes of discussion herein, overriding describes movement of the shaft 18 that exceeds the tolerance range. In the example of FIG. 6, ΔY represents a tolerance range of distance of the shaft 18 in a direction represented by the Y axis and ΔZ represents a tolerance range of distance of the shaft 18 in a direction represented by the Z axis. An example of ΔY and ΔZ ranges up to about 0.003 inches. Further shown is that the frame 32 is positioned so that the feet $42_{1,2}$ extend lengthwise along the outer edge of the side casing 20, and the bolts 68 insert within slots $44_{1,2}$. Optionally, nuts 70 are threadingly secured onto bolts 68 for anchoring the pump shaft stand 30 to the side casing 20. In one alternative, a Dial Test Indicator ("DTI") 78 is added which has a tip in contact with the outer surface of shaft 18 for monitoring radial movement of shaft 18 to confirm that movement is within the tolerance range. In examples in which the placement of receptacle 48 requires vertical adjustment (e.g., in a direction represented by the Z axis) so that shaft 18 is positioned in a non-damaging orientation, the nut 56 is rotated about the rod 52 to raise and/or lower elevation of receptacle 48 to maintain orientation of shaft 18 in a position that prevents damage to shaft 18 and/or associated seals (not shown). Monitoring radial movement of shaft 18 is an example of operation that indicates a need to reposition shaft 18 (and receptacle 48). It is within the capabilities of one skilled to identify a position or orientation of the shaft 18 in which the shaft 18 and/or seals is/are susceptible or vulnerable to being damaged, such as being out of a tolerance range.

Figure 7:
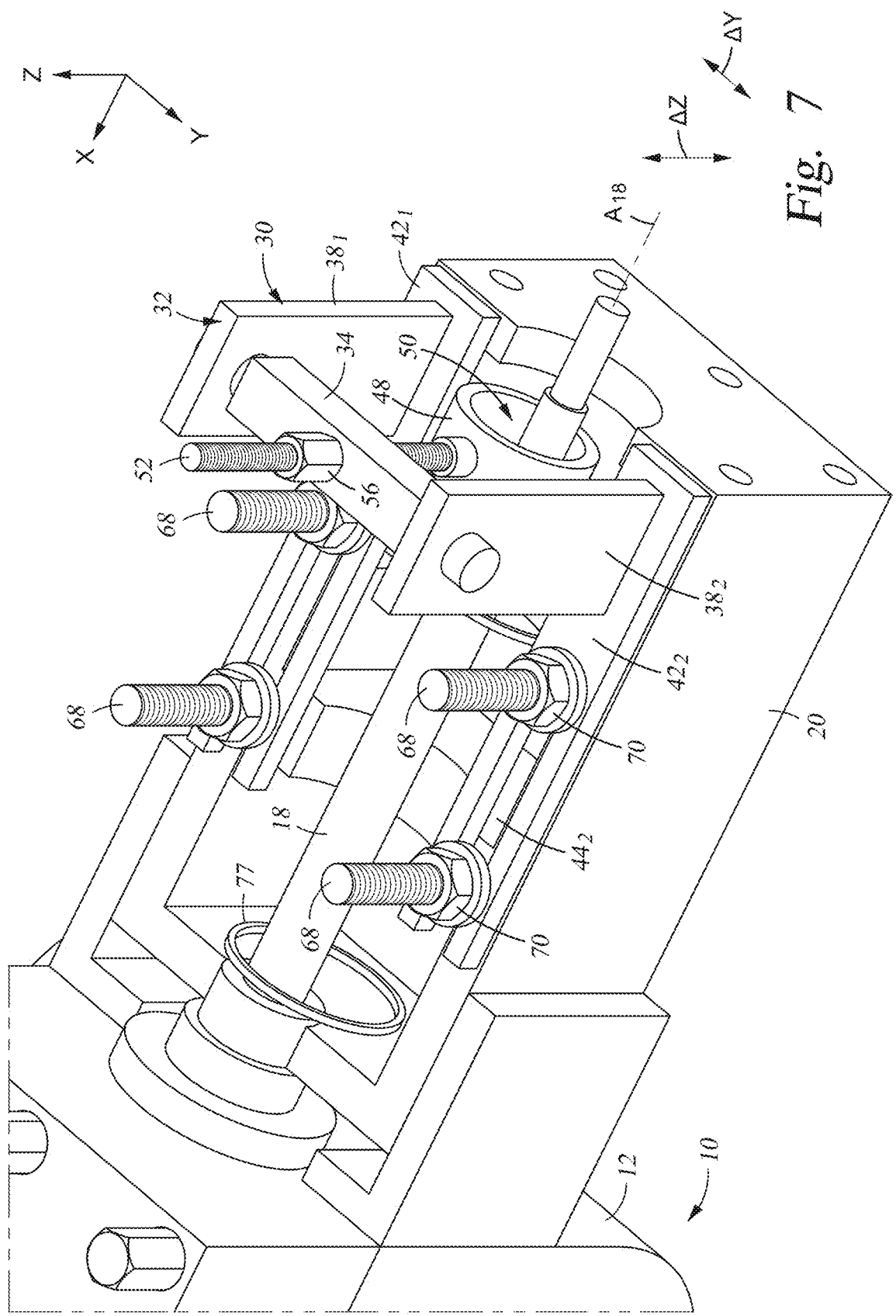
FIG. 7 is a perspective view of the example of servicing the pump of FIG. 6 having the lower shaft bearings removed.

Shown in FIG. 7 is a perspective view of servicing of the pump 10 in which the lower bearing 76 (FIG. 6) have been removed from within the side casing 20. As shown, the presence of the pump shaft stand 30 provides for a consistent and reliable way of maintaining orientation and position of shaft 18 so that any movement of shaft 18 is maintained within an acceptable tolerance ranges of ΔX and ΔZ to prevent the damage to the shaft 18 or seal 77. In a subsequent step of servicing the pump 10, after new or refurbished bearings 72, 74, 76 are installed inside side casing 20 and adjacent shaft 18, and the casing 20 is secured in place, the pump 10 is reconnected to motor 22 (FIG. 1) and put back into service and without being damaged during servicing.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of servicing a pump comprising:
   obtaining a pump shaft stand that comprises a frame, an elevator supported on the frame, and a receptacle coupled with the elevator;
   adjusting the elevator to place the receptacle at a designated position, so that when the receptacle engages a pump shaft of the pump, the pump shaft is in a non-damaging orientation; and
   engaging the pump shaft with the pump shaft stand and supporting the pump shaft in the non-damaging orientation;
   wherein the frame comprises feet with elongated slots, wherein a housing of the pump comprises a bolt, the method further comprising securing the frame to the housing by inserting the bolt through one of the slots and fastening a nut onto the bolt.

2. The method of claim 1, further comprising removing lower bearings from beneath the pump shaft after the pump shaft is engaged with the pump shaft stand.

3. The method of claim 1, wherein the elevator comprises a rod with a threaded outer surface and a fastener in abutting contact with the frame and that is threadingly coupled with the rod.

4. The method of claim 3, wherein adjusting the elevator comprises rotating the fastener.

5. The method of claim 1, further comprising monitoring a position of the shaft with a Dial Test Indicator ("DTI"), and further adjusting the elevator based on the monitored position.

6. The method of claim 1, wherein the frame comprises legs having apertures formed therethrough and a cross beam on which the elevator is mounted, wherein opposing ends of the cross beam inserts into the apertures.

7. The method of claim 6, further comprising adjusting placement of the frame by sliding the legs with respect to the cross beam.

8. The method of claim 1, wherein the pump is partially disassembled prior to engaging the pump shaft with the pump shaft stand, the method further comprising reassembling the pump.

9. The method of claim 8, further comprising moving the pump shaft stand to a different pump and repeating the steps of adjusting and engaging.

* * * * *